US007273343B2

(12) United States Patent
Ziegler

(10) Patent No.: US 7,273,343 B2
(45) Date of Patent: Sep. 25, 2007

(54) ROTARY PICK AND PLACE TECHNOLOGY

(75) Inventor: Kelly Ziegler, Crosby, MN (US)

(73) Assignee: Graphic Packaging International, Inc., Marietta, GA (US)

( * ) Notice: Subject to any disclaimer, the term of this patent is extended or adjusted under 35 U.S.C. 154(b) by 0 days.

(21) Appl. No.: 10/235,387

(22) Filed: Sep. 5, 2002

(65) Prior Publication Data

US 2004/0013508 A1    Jan. 22, 2004

Related U.S. Application Data

(60) Provisional application No. 60/317,586, filed on Sep. 5, 2001.

(51) Int. Cl.
*B66C 1/00* (2006.01)

(52) U.S. Cl. ............... 414/732; 414/680; 414/736; 414/737; 414/756; 198/474.1; 198/797

(58) Field of Classification Search ............ 414/732, 414/736, 737, 756, 680; 198/474.1, 797
See application file for complete search history.

(56) References Cited

U.S. PATENT DOCUMENTS

| 4,643,633 | A |   | 2/1987  | Lashyro |             |
|-----------|---|---|---------|---------|-------------|
| 4,881,934 | A | * | 11/1989 | Harston et al. | 493/315 |

(Continued)

FOREIGN PATENT DOCUMENTS

| DE | 40 29 520 A1 | 3/1992 |
|----|--------------|--------|
| DE | 44 39 723 A1 | 5/1996 |
| DE | 198 01 194 A1 | 7/1999 |
| DE | 199 09 754 A1 | 9/2000 |

OTHER PUBLICATIONS

New Rotary Feeder Accommodates Products That Are Difficult To Handle; Food and Drug Packaging Magazine; Mar. 2000.

*Primary Examiner*—David H. Bollinger
*Assistant Examiner*—M. S Lowe
(74) *Attorney, Agent, or Firm*—Womble Carlyle Sandridge & Rice, PLLC

(57) ABSTRACT

A rotary transfer apparatus, comprising a frame structure; a rotatable main shaft supported by the frame structure; a first planetary member connected to the main shaft; at least one first planetary shaft rotatably connected to the first planetary member and rotating in relation to the main shaft; a secondary body connected to each first planetary shaft; a second planetary shaft rotatably connected to each secondary body and rotating in relation to the first planetary shaft; an article transfer mechanism connected to each second planetary shaft; and an offset cam mechanism. The article transfer mechanism is adapted for picking and placing articles, and has at least one stem connected to the second planetary shaft. Each stem has a distal end whose motion defines a product path about the main shaft. The product path has at least two apexes, with one apex wherein the distal end of the stem moves in an in-line motion and another apex wherein the distal end of the stem moves in a non-identical motion. The offset cam mechanism is adapted for providing both in-line motion and non-identical motion at the apex(es) of the product path.

22 Claims, 8 Drawing Sheets

U.S. PATENT DOCUMENTS

| | | |
|---|---|---|
| 4,901,843 A | 2/1990 | Lashyro |
| 4,902,192 A * | 2/1990 | Ziegler ........................ 414/732 |
| 5,019,207 A * | 5/1991 | McCoy ........................ 156/571 |
| 5,257,888 A * | 11/1993 | Kronseder ............. 414/416.06 |
| 5,431,274 A | 7/1995 | Schaupp |
| 5,456,570 A | 10/1995 | Davis et al. |
| 5,704,758 A | 1/1998 | Davis et al. |
| 5,910,078 A | 6/1999 | Guttinger et al. |
| 5,997,458 A | 12/1999 | Guttinger et al. |
| 6,273,242 B1 | 8/2001 | Olson et al. |

* cited by examiner

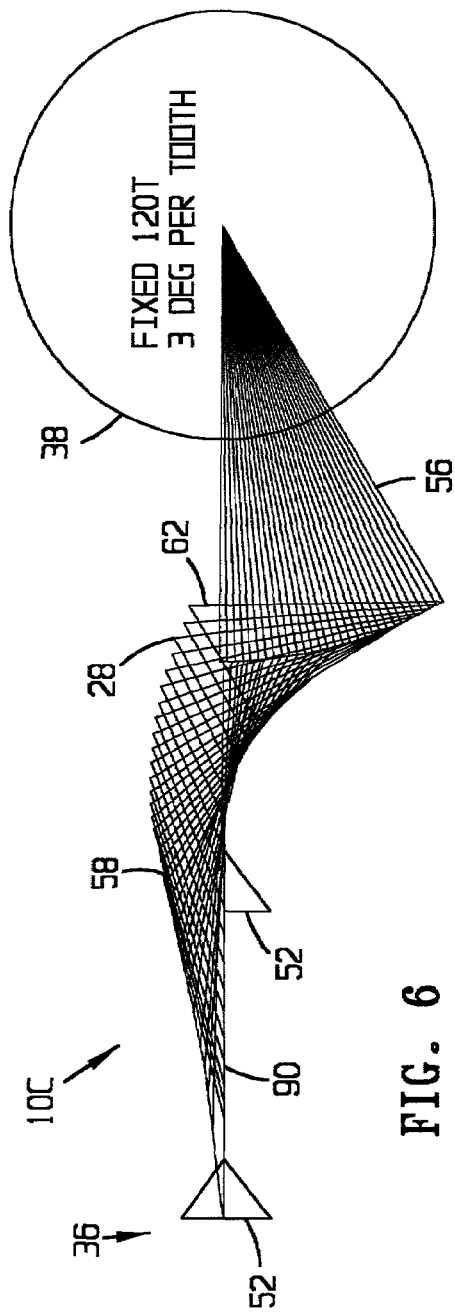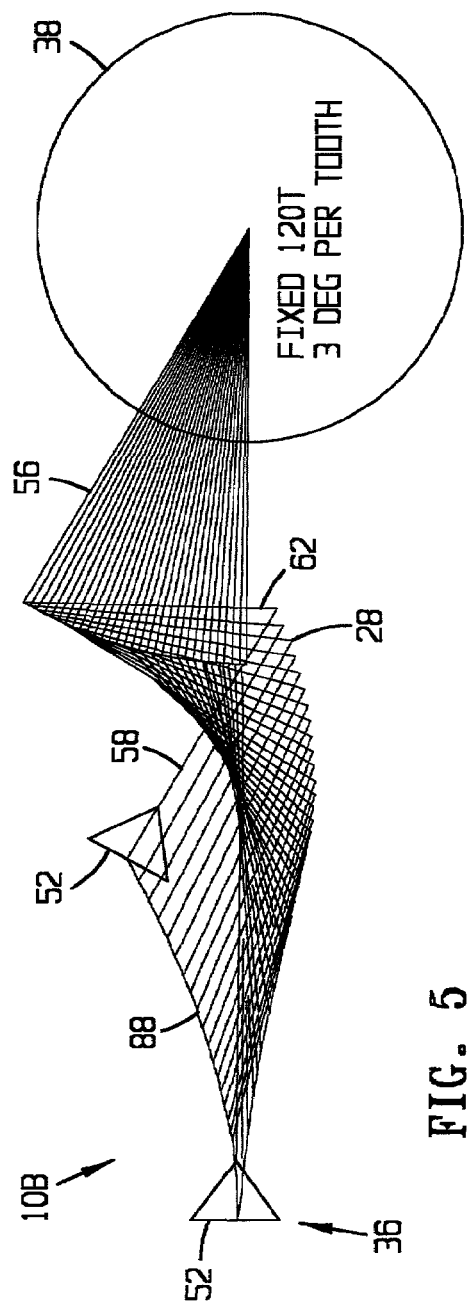
FIG. 6
FIG. 5

TWO HEAD THREE STOP

ROTARY PICK AND PLACE TECHNOLOGY

CROSS-REFERENCE TO RELATED APPLICATIONS, IF ANY

This application claims the benefit under 35 U.S.C. §119 (e) of now abandoned U.S. Provisional Patent Application Ser. No. 60/317,586, filed Sep. 05, 2001, which is hereby incorporated by reference.

STATEMENT REGARDING FEDERALLY SPONSORED RESEARCHED OR DEVELOPMENT

Not applicable

REFERENCE TO A MICROFICHE APPENDIX, IF ANY

Not applicable.

BACKGROUND OF THE INVENTION

1. Field of the Invention

The present invention relates, generally, to an apparatus adapted for the pickup, transfer, and the delivery of articles. More particularly, the invention relates to a rotary transfer apparatus with an offset cam mechanism adapted for enabling an extended in-line or near in-line motion at selected points of pickup and delivery, as well as providing non-identical motion of the article at other selected points of the article path.

2. Background Information

It is both necessary and desirable in manufacturing, assembly and packaging operations to pickup, transfer and deliver articles of various shapes and dimensions in a reliable, precise and high speed manner. A rotary transfer apparatus consistently reaches the desired pick and place result, although other types of such devices have been developed. A rotary transfer apparatus is shown in U.S. Pat. No. 4,643,633, which is assigned to Applicants' assignee and is herein incorporated by reference.

Known apparatus and methods for picking, transferring and placing articles are believed to have significant limitations and shortcomings. For example, due to the many configurations of manufacturing equipment and the varying shapes and sizes of the articles produced and/or processed, it is difficult to precisely and reliably pickup, transfer and place these articles without damaging them. Deeply nested articles and articles with relatively long product tails pose a particular problem. A long stem is desirable for deeply nested articles in order to extend into and securely contact the articles. Additionally, both deeply nested articles and articles with long product tails cannot be rotated too quickly near the apex points of pickup and delivery, or else they will contact and possibly damage each other. Thus it is desirable for a rotary transfer apparatus to have both a long stem and an extended in-line motion at the apex points of placement and delivery. To solve this problem, a rotary transfer apparatus with an in-line cam mechanism is disclosed in U.S. Pat. No. 6,273,242, which is assigned to Applicants' assignee and is incorporated by reference.

This technology is believed to have significant limitations and shortcomings, including, but not limited to, that the several stops or positions of the machines are identical or substantially similar. It is frequently desirable and/or necessary to perform more than one article handling operation with a single rotary transfer apparatus. For example, at one apex point, an article is picked up, at a second apex point, the article is swiped across a bar code reader, and at a third apex point the article is placed on a stack or on a conveyor. At the picking and placing apexes, it is desirable to have extended in-line motion, as described above, while at the swiping apex, an out-of-line, sweeping motion of the article is required to read the bar code. An advancing cam mechanism is illustrated for a non-secondary motion rotary transfer apparatus in U.S. Pat. No. 4,901,843, which is assigned to Applicants' assignee and is hereby incorporated by reference. U.S. Pat. No. 6,273,242 disclosed combining this advancing cam mechanism with a secondary motion rotary transfer apparatus; however, the resulting apparatus is highly complex.

The rotary transfer apparatus of the present invention is believed to constitute an improvement over existing technology. An offset cam mechanism is added to the secondary motion of a rotary transfer apparatus in order to provide an apparatus with an extended in-line or near in-line motion at selected points of pickup and placement, as well as providing non-identical motion of the article at other selected article path apexes. The extended in-line motion promotes precise contact between the transfer mechanism and the articles and further enables the transfer apparatus to successfully pick and place both deeply nested articles and articles with relatively long product tails, while the non-identical motion provides for performing other non-identical operations on the article.

This invention provides a rotary pick and place machine which is believed to fulfill the need and to constitute an improvement over the background technology.

All US patents and patent applications and all other published documents mentioned anywhere in this application are incorporated by reference in their entirety.

BRIEF SUMMARY OF THE INVENTION

The present invention provides a secondary motion rotary pick and place apparatus/method. Advantages and significant features of the invention include, but are not necessarily limited to, that each of the several (for example 3, 4, or more) stops are separately configurable.

The present invention provides a rotary transfer apparatus adapted for picking, transferring and placing articles, and generally comprises a frame structure, a first planetary member, and at least one second planetary member, an article transfer mechanism, and an associated offset cam mechanism. The frame structure supports a main shaft that is driven by a drive source and is adapted for rotating in relation to the frame structure. The first planetary member is connected to and rotates with the main shaft. At least one first planetary shaft is rotatably connected to the first planetary member and rotates in relation to the main shaft. The number of first planetary shafts preferably corresponds to the number of second planetary members. Each second planetary member is connected to and rotates with one of the first planetary shafts. A second planetary shaft is rotatably connected to each of the second planetary members and rotates in relation to the first planetary shaft. Each article transfer mechanism is connected to one of the second planetary shafts and is adapted for picking, transferring and delivering/placing articles at predetermined locations. The article transfer mechanism has a stem with a distal end whose motion defines a path about the main shaft. The path has at least one apex at which point the distal end of the stem moves in an in-line motion, and at least one apex at which the distal end of the stem moves in a motion non-identical to inline motion. The offset cam mechanism extends the in-line motion at one apex and provides non-identical motion at another apex. For the purposes of this application, the term "in-line motion" is defined to include near in-line motion or close to in-line motion.

The first planetary member moves in a primary motion and the second planetary member moves in a secondary motion. Properly timed or programmed motors, such as servo motors, could be used to drive the main shaft, first planetary shafts and second planetary shafts to produce the desired primary and secondary motions. Mechanical means for generating these motions are illustrated and disclosed below. A primary stationary gear is mounted or otherwise connected to the frame, and the main shaft extends there through and rotates in relation to the primary stationary gear. A primary planetary gear is attached to each of the first planetary shafts and is in rotational communication with the primary stationary gear through a first rotation means. A secondary stationary gear is mounted or otherwise connected to the first planetary member, and each of the first planetary shafts extends there through and rotates in relation to one of the secondary stationary gears. A secondary planetary gear is attached to each of the secondary planetary shafts and is in rotational communication with the secondary stationary gear through a second rotation means. The first rotation means for rotating the first planetary shaft about the first stationary gear comprises either a first idler gear meshingly disposed there between, or a continuous belt disposed about these two gears. The second means for rotating the second planetary gear about the second stationary gear, likewise, consists either of a second idler gear engagingly disposed there between, or a second continuous chain meshingly disposed about the second stationary and the second planetary gear.

Each article transfer mechanism has a hollow shaft for the timed application of a vacuum from a vacuum source and at least one adjustable vacuum cup in communication with the hollow shaft, via a vacuum hose or other line for example, that contacts the article at the pick location. The hollow shaft may be the secondary planetary shaft, or a portion thereof, or a separate shaft coaxially aligned with the secondary planetary shaft. The vacuum is applied to remove the article from the pick location, maintained during the transfer to the placement or delivery location, and removed to release the article at the place location. The article transfer mechanism is generally disposed outwardly from the second planetary shaft.

The rotary transfer apparatus possesses a primary motion and a secondary motion, which when timed by the use of the appropriate predetermined gearing ratios for the illustrated mechanical embodiments, provides a wide variety of available transfer paths and available article pick and delivery locations. The gear ratio between the primary planetary gear and the primary stationary gear determines the number of apex positions of travel for the remaining outer elements of the device. Any of a number of process specific operations may be performed at each of these apexes. For example, it may be desirable to pick articles at a first apex, present the articles at a second apex in order to place a label on the articles, and restack the articles or place the articles onto a conveyor at a third apex. Other processes performed at these apexes may include, for example, printing, scoring, folding, gluing and scanning. The gear ratio between the secondary planetary gear and the secondary stationary gear causes the article transfer mechanism to continually face in an outward position during its course of travel around the main shaft, so that relatively large articles can be effectively transferred without contacting other articles or the apparatus, or without the need to expand the physical dimensions of the device itself.

An extended in-line motion and/or a longer stem length may be desirable or even necessary for deeply nested articles and for articles with longer product tails. A four-stop secondary motion rotary transfer apparatus enables a relatively larger stem to be used and provides a degree of in-line motion. The offset cam mechanism is adapted to apply a predetermined offset motion to the secondary stationary gear that extends, enhances or lengthens the in-line motion near selected apexes of the product path. Similarly, the offset cam mechanism is adapted to apply a non-identical motion, such as a sweeping motion, to the article at another selected apex of the product path. Benefits of the extended in-line motion include the ability to successfully pick deeply nested products and articles with relatively long product tails and to restack or otherwise place these articles into a magazine or onto a conveyor. The capability of performing two or more non-identical motions or functions increases the utility of the apparatus and is unique.

The features, benefits and objects of this invention will become clear to those skilled in the art by reference to the following description, claim, if any, and drawings.

BRIEF DESCRIPTION OF THE SEVERAL VIEWS OF THE DRAWING

FIG. 5 is a geometric, time-location diagram showing the transfer path of an article moving toward an apex in a four-stop, secondary motion, rotary transfer apparatus that does not have an offset cam mechanism.

FIG. 6 is a geometric, time-location diagram, showing an extended inline transfer path of an article moving away from an apex in a four-stop, secondary motion, rotary transfer apparatus that has an offset cam mechanism.

DETAILED DESCRIPTION

The present invention provides a secondary motion, rotary pick and place apparatus and method thereof. Advantages and significant features of the invention include, but are not necessarily limited to, that the several (for example 3, 4 or more) stops are separately configurable. For example, one stop may have in-line motion, another stop may have a sweeping motion, and still another stop may have a different motion or functionality. Additionally, two or more stops may have the same motion while another stop has a different motion. Still further, all of the stops of the apparatus may be configured to have the same motion. Configurable motion or functionality is provided by a cam, which is preferably offset, which is particularly located, and by a particular gearing ratio.

Figure 3:
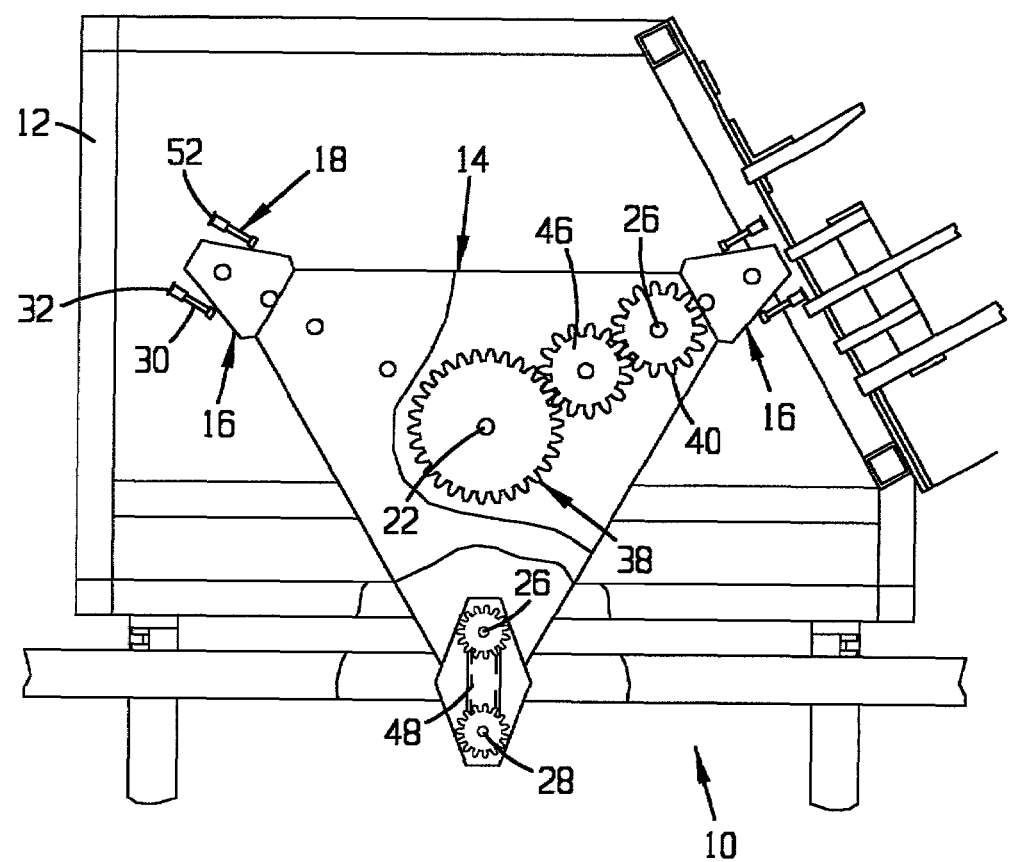
FIG. 3 is a side plan view, with cut-away portions, of an embodiment of the secondary motion, rotary transfer apparatus of the present invention, which is shown configured as a four-stops, but which is adaptable for three stops for example.

Referring to the FIG. 3, an embodiment of the present invention, in a four stop configuration, is illustrated and generally indicated by the reference numeral 10. The rotary transfer apparatus 10 is described below first in terms of its major structural elements, next in terms of its primary and secondary motion, and finally in terms of more detailed structural and/or functional elements of a secondary motion, rotary transfer apparatus and the cam mechanism which cooperate to precisely pickup, transfer and deliver articles from one location to another. FIGS. 4 and 7-10 show alternative embodiments of the apparatus with easily adaptable alternative stop and head variations. The teachings of this invention are also readily adaptable between 3, 4 and more stop systems. The descriptions herein are provided in the context of both 3 and 4 stop systems for brevity.

Major Structural Elements

Figure 4:
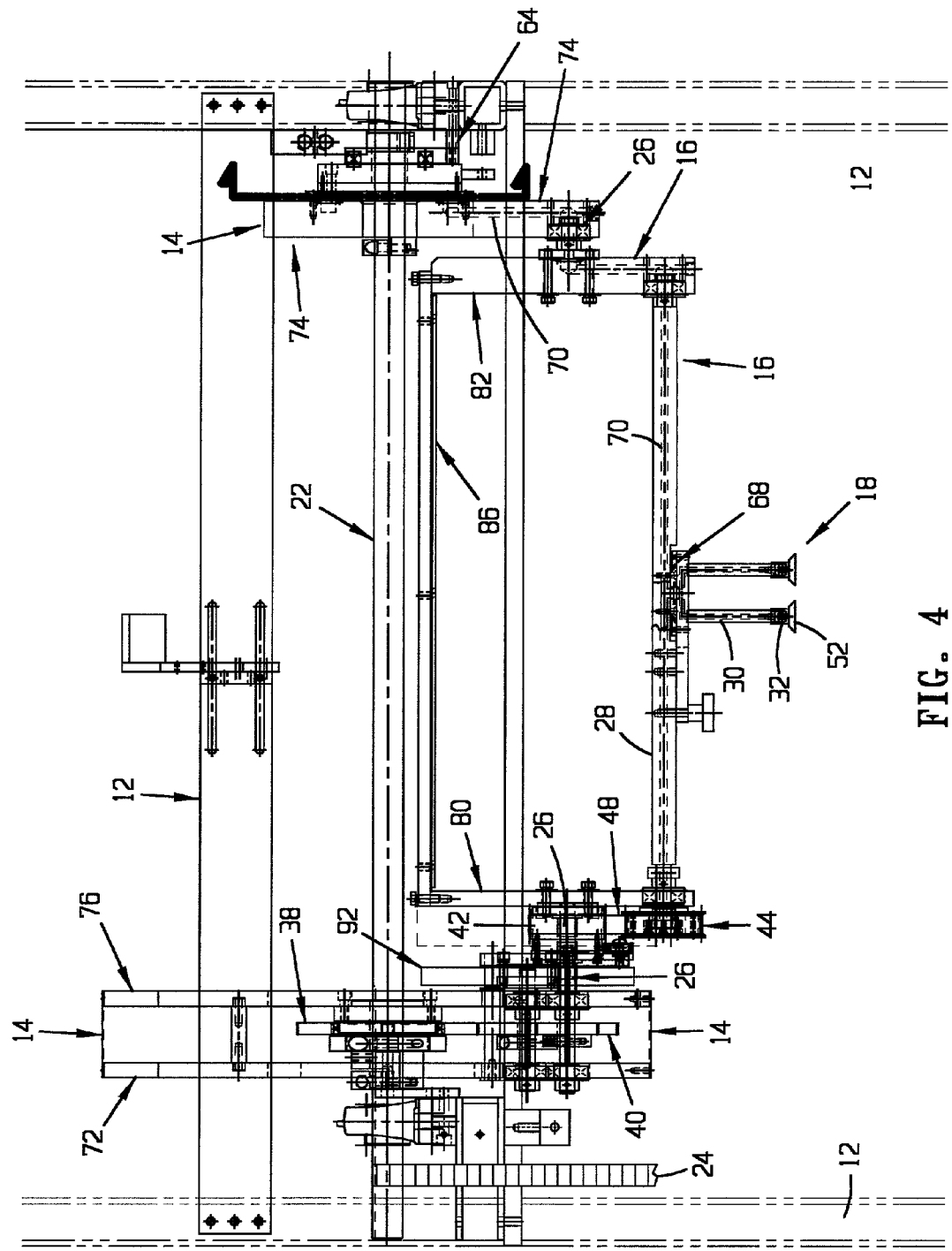
FIG. 4 is a front plan view of an embodiment of the rotary transfer apparatus of the present invention, which is shown configured for three-stops, but which is adaptable for four stops, for example, such as that shown in FIG. 3.

Referring generally to FIGS. 3 and 4, the rotary transfer apparatus 10 generally comprises a frame structure 12, a first planetary member 14, and at least one second planetary member 16, an article transfer mechanism 18, and an associated offset cam mechanism 20. The frame structure 12 supports a main shaft 22 that is driven by a drive source 24, for example a motor with chain drive, with the main shaft 22 adapted for rotating in relation to the frame structure 12. The first planetary member 14 is connected to and rotates about the main shaft 22. At least one first planetary shaft 26 is rotatably connected to the first planetary member 14 and rotates in relation to the main shaft 22. The number of first planetary shafts 26 preferably corresponds to the number of second planetary members 16. Each second planetary member 16 is connected to and rotates with one of the first planetary shafts 26. A second planetary shaft 28 is rotatably connected to each of the second planetary members 16 and rotates in relation to the first planetary shaft 26. Each article transfer mechanism 18 is connected to one of the second planetary shafts 28 and is adapted for picking, transferring and delivering/placing articles at predetermined locations. The article transfer mechanism 18 has a stem 30 with a distal end 32, whose motion defines a path 34 about the main shaft 22. The path 34 has at least one apex 36, at which point the distal end 32 of the stem 30 moves in a selected motion, which is separately configurable. The selected motion may be a sweeping motion or an in-line motion. An in-line motion, for the purposes of this application, is defined to include an in-line or near in-line motion of a stem 30, so that the radial component of an article's motion is considerably greater than the rotational component about the main shaft 22. The cam mechanism 20 provides the separately configurable, selected motion at each path apex 36.

It is within the purview of this invention that belts and chains are general equivalents, as are pulleys and sprockets, which cooperate with them.

In the illustrated embodiment, the first planetary member 14 moves in a primary motion, and the second planetary member 16 moves in a secondary motion. A primary stationary gear 38 is mounted to the frame structure 12, and the main shaft 22 extends through and rotates in relation to the primary stationary gear 38. A primary planetary gear 40 is attached to each of the first planetary shafts 26 and is in rotational communication with the primary stationary gear 38 through a first rotation means. At least one secondary stationary gear 42 is mounted to the first planetary member 14, and one of the first planetary shafts 26 extends through and rotates in relation to each secondary stationary gear 42. A secondary planetary gear 44 is attached to each of the secondary planetary shafts 28 and is in rotational communication with the secondary stationary gear 42 through a second rotation means. The first rotation means for rotating the first planetary gear 40 about the primary stationary gear 38 comprises either a first idler gear 46 meshingly disposed there between, or a continuous chain disposed about gears 38 and 40. The second means for rotating the secondary planetary gear 44 about the secondary stationary gear 42, likewise, consists either of a second continuous chain 48, meshingly disposed about the gears 42 and 44, or a second idler gear, engagingly disposed there between.

Each article transfer mechanism 18 has a hollow shaft 50 for the timed application of vacuum from a vacuum source and at least one adjustable vacuum cup 52, in communication with the hollow shaft 50 that contacts the article at the pick location. The hollow shaft 50 may be the second planetary shaft 28, or a portion thereof, or a separate shaft coaxially aligned with the second planetary shaft 28. The vacuum is applied to remove the article 54 from the pick location, maintained during the transfer to the placement or delivery location, and removed to release the article 54 at the place location. The article transfer mechanism 18 is generally disposed outwardly from the second planetary shaft 28.

Primary and Secondary Motion

As mentioned above, the rotary transfer apparatus 10 moves in a primary motion and a secondary motion to achieve a desired result or transfer path. Primary motion, without secondary motion, has been described in detail, and the drawbacks of an article handling apparatus using only primary motion were noted earlier in U.S. Pat. No. 6,273,242.

Figure 1:
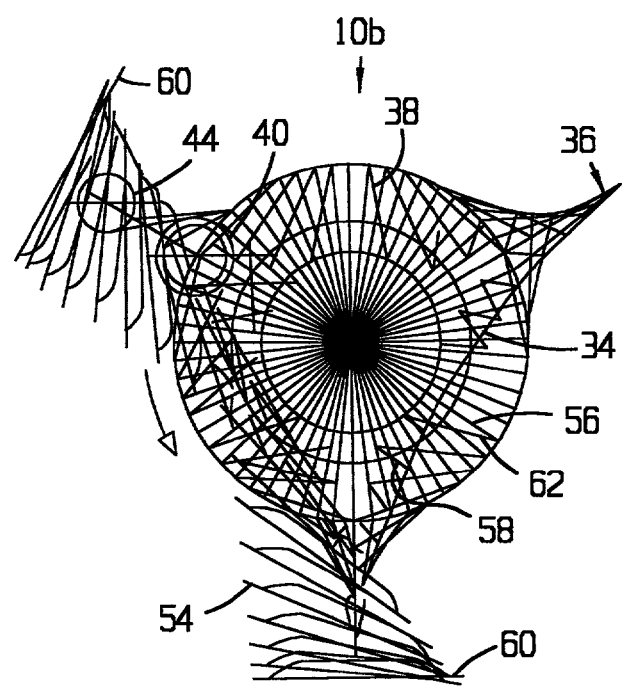
FIG. 1 is a geometric, time-location diagram, which shows the transfer path of an article in a three (3)-stop, secondary motion, rotary transfer apparatus.
Figure 2:
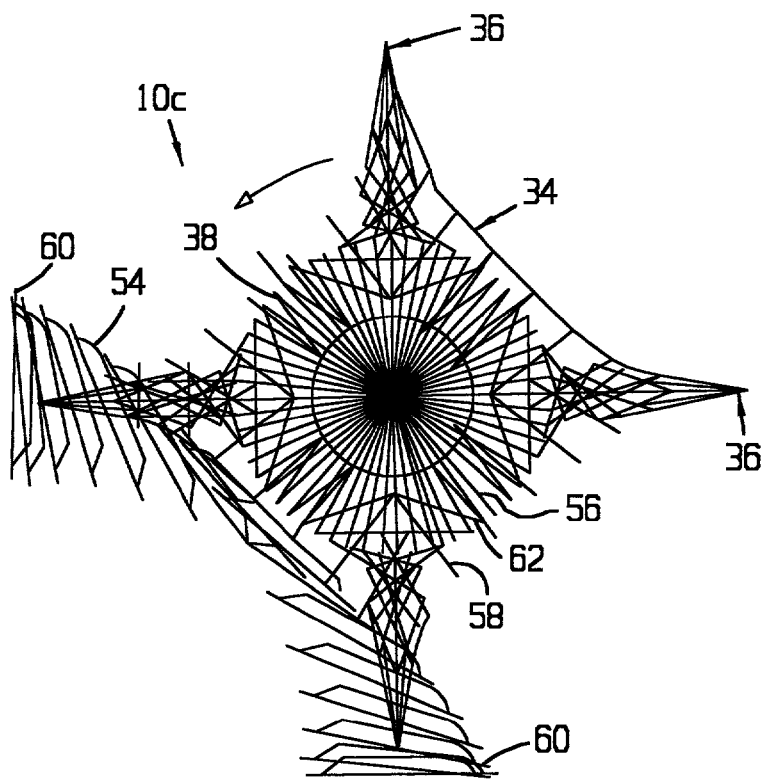
FIG. 2 is a geometric, time-location diagram, which shows the transfer path of an article in a four (4)-stop, secondary motion, rotary transfer apparatus.

Secondary motion, such as that generated by a rotary transfer apparatus with secondary motion 10b, 10c, is generally illustrated by the time-location diagrams of FIG. 1 and FIG. 2, where three segments are shown. The diagrams pertain to a four head rotary apparatus. Alternative head numbers may be used consistent with the teachings of the invention. The set of primary body line segments 56 represents the length from the center of the main shaft 22 to the center of the first planetary shaft 26. The set of secondary body line segments 62 represents the length from the center of the first planetary shaft 26 to the center of the second planetary shaft 28, i.e. the vacuum shaft 50. The set of stem line segments 58 represents the length from the tip of the suction cups 52 to the center of the vacuum shaft 50.

The problems in relation to the three stop, no secondary motion apparatus are at least somewhat alleviated by adding the secondary motion. For example, with a 1:1 gear ratio between the secondary stationary gear 42 and the secondary planetary gear 44, the article 54 will remain oriented away from the main shaft 22. This secondary motion arrangement is particularly useful for the movement and placement of relatively large articles, such as cartons or articles with longer tails 60, for example, because the dimension requirements of the rotary transfer device 10 do not need to accommodate the movement of these large articles in the interior of the apparatus. In the case of a three-stop apparatus, illustrated in FIGS. 1, in which there is a 3:1 gear ratio between the primary planetary gear 40 and the primary stationary gear 38, the articles 54 will only rotate 120° for every 120° of travel about the main shaft 22. The result is less overall product motion and a degree of in-line motion at the apexes 36, which results in less product rotation near the points of place and pick, and ultimately results in less damage to the articles and greater overall precision.

As illustrated in FIG. 2, a four-stop, secondary motion rotary transfer apparatus 10c, in which there is a 4:1 gear ratio between the primary planetary gear 40 and the primary stationary gear 38, results in a greater degree of in-line motion at the apexes 36 and less product rotation near the points of place and pick. In addition to the longer in-line motion, the four-stop, secondary motion rotary transfer apparatus may have a longer stem length 30 and 58 that is desirable to securely contact deeply nested articles. If the illustrated embodiment is rotated in the direction of the arrow, the articles 54 are picked at 9 o'clock and placed at 6 o'clock. The apparatus may be rotated in the other direction and other pick and place points may be used. These embodiments of secondary motion lack versatility, in that the same motion or function is performed at each apex 36 of the article path 34, as shown by the time-location diagrams of FIGS. 1 and 2. To increase the capabilities of the primary/secondary motion apparatus 10, improvements have been added.

Detailed Elements of a Secondary Motion, Rotary Transfer Apparatus

Referring to FIGS. 3-4, the illustrated rotary transfer apparatus 10 has a frame structure 12, a drive source 24, and a vacuum source conduit 64, which is connected to a vacuum pump (not shown). The frame structure 12 is generally of a rigid, tubular metal construction, or the like. The frame structure 12 can be designed and constructed to cooperate with a variety of mechanized operations, machines or devices, such as assembly lines, packaging equipment or conveyor systems, which require the removal, transfer and/or deposit of certain articles, such as cartons, cups, labels, etc. The illustrated frame structure 12 is generally a free standing unit, placed on the floor or on a stand in proximity to a conveyor system, or the like, but it can also be constructed as part of such equipment.

The main shaft 22 is journaled to the frame structure 12. The shaft 22 is rotatable and driven by a motor or other drive source 24. As illustrated in FIG. 4, a continuous drive chain 24, rotated by a motor (not shown), is mounted to the main shaft 22 to drive it and the components attached or mounted thereto, and those in communication with those components. Although not specifically shown in the drawings, the drive source 24 adapted for rotating the drive shaft may alternatively comprise an arrangement of gears, sprockets and chains, and/or pulleys and belts.

Mounted to the main shaft 22 and for rotation therewith is the first planetary member 14 that is generally comprised of two opposing side plate members 76 and 74. Additional side plate members 72 may be used for stabilization and protection purposes. The primary stationary gear 38 is immovably fixed or mounted to the frame structure 12. Thus, the first planetary member 14 rotates with the main shaft 22, while the primary stationary gear 38 remains in a fixed position.

The primary planetary gear 40 and first planetary shaft 26 rotate about the primary stationary gear 38 through the first idler gear 46, which meshes in rotational communication with the primary stationary gear 38 and the primary planetary gear 40. As is further shown, an idler shaft extends through the first idler gear 46 and between plates 72 and 76, while the first planetary shaft 26 extends through the primary planetary gear 40 and is mounted between these same two plates 72 and 76. Thus, as the plate members 72 and 76 are rotated by the main shaft 22, the first idler gear 46 is driven by virtue of its communication with the primary stationary gear 38, and the primary planetary gear 40 is rotated in the opposite direction in relation to the idler gear 46.

The gear ratio between and the initial respective positions of the primary planetary gear 40 and the primary stationary gear 38 determine the number and location of the apexes 36 or the outward positions of the elements affixed to the primary planetary gear 40. For example, a gear ratio of 3:1 results in three apex positions, since the primary planetary gear 40 revolves three times for each orbit around the primary stationary gear 38. The precise repeatability of these apex positions enables the apparatus to perform a predetermined function at these locations, such as pick, sweep, print and glue. The circumference, i.e. number of teeth, of the first idler gear 46 does not affect the number of apex positions. Therefore, the same idler gear 46 may be used for a 3:1 planetary gear or a 4:1 planetary gear simply by changing its location to accommodate a different sized planetary gear 40.

The first planetary shaft 26 extends inwardly from the primary planetary gear 40 and the first planetary member 14, and the second planetary member 16, generally comprised of plate members 80 and 82, is mounted thereto for rotation with the first planetary shaft 26. The secondary stationary gear 42 is mounted exterior the plate 80 and around the first planetary shaft 26. An anchor member 84 or similar device rigidly connected between the secondary stationary gear 42 and the plate members of the first planetary member 14 holds the secondary stationary gear stationary 42 in relation to the first planetary member 14.

The secondary planetary gear 44 rotates about the secondary stationary gear 42 through a continuous belt 48, meshingly disposed about the gears 42 and 44. The second planetary shaft 28 extends inward and is rotated with the secondary planetary gear 44. The article transfer mechanism 18 includes a hollow rotatable transfer shaft 50, having journals that form the secondary planetary shaft 28, a vacuum manifold 68 and at least one outwardly extending vacuum cup 52. The vacuum cup members 52 may be adjustably mounted to a slotted mounting plate, which permits the adjustment of the vacuum cups 52 to conform to the requirements of the article 54 to be transferred. The number and arrangement of vacuum cups 52 used within the article transfer mechanism 18 may be modified to properly grasp the article, as the dimensions of article require. In a square arrangement of four vacuum cups 52, an in-line motion allows each the cups 52 to effectively contact the articles 54. The distance between the end of the vacuum cups 52 and the rotatable transfer shaft 50 is referred to as a stem length, and longer stem lengths are advantageous and necessary for deeply nested articles. However, the size and shape of the articles and the dimensions of the rotary transfer apparatus itself limit the size of the stem.

Although the apparatus 10 shown in FIG. 3 is designed to have three article transfer mechanisms 18, the third has been omitted to more clearly illustrate the gears and continuous chain 48 in the second planetary member 16. The transfer mechanisms 18 are driven, as shown, by the secondary planetary gear 44 and second continuous chain 48 which moves relative to the secondary stationary gear 42 as part of the second planetary member 16, which in turn rotates in relation to the first planetary member 14. This same rotating means is used to drive the other transfer mechanisms 18.

Hollow stems 30 are in communication with the vacuum cups 52, the manifold 68 and the hollow shaft 50. Interiorly slotted and ported vacuum valves, i.e. a metal valve with ports and a rotating nylon valve with aligned slots, are connected to a vacuum source through a conduit and alternatively control the vacuum applied at the cups 52.

As shown in FIG. 4, the vacuum source conduit 64 connectably communicates with the cooperating slotted and ported vacuum valves. These interiorly slotted valves are generally known in the art, and they produce the predetermined application of vacuum at the article transfer mechanism via a number of hollow shafts. A pair of dashed lines denotes the vacuum path 70 from the vacuum source conduit 64 through the various rotating components. The cooperating slotted vacuum valves are preferably rotationally adjustable for fine-tuning the precise locations of vacuum operability at the apex positions 36 of the article transfer mechanisms 18. The valves preferably are provided with cooperating features adapted for stopping the vacuum of the rotary device when the article supply has been depleted or when a product source on which the articles are to be placed has been stopped. The use of additional ports in the nylon valve, electric eyes, micro-switches solenoid valves provide these features.

Depending upon the nature and speed of the rotary transfer apparatus, it may be necessary or desirable to attach counter balance weights 86 at the interior upper portions of the plate members 80, 82, for example, as shown in FIG. 4, to provide a smooth and continuous motion.

Cam Control of Stop Position Functionality

In a secondary motion, rotary transfer apparatus, the cam mechanism 20, which is preferably offset, extends the in-line motion of the stem 30 by providing an oscillating rotational offset motion to a second planetary shaft 28. The benefit of this oscillating rotational offset motion is illustrated, wherein FIG. 5 illustrates the motion of a secondary motion, rotary transfer apparatus 10b, advancing 30° about the primary stationary gear 38 toward an apex 36, and FIG. 6 illustrates the motion of a secondary motion, rotary transfer apparatus with an offset cam mechanism 10c, receding 30° about the primary stationary gear 38 away from an apex 36. Without the cam mechanism 20, the stem 30, 58 undergoes a relatively significant rotation, which may result in damaging nested or rigid articles. The cup 52 follows a tapered path 88 in toward the apex while the second planetary shaft 28, i.e. the joint between the stem line segment 58 and the secondary body line segment 62, extends on the opposite side of the in-line path 90. With the cam mechanism 20, the stem 30, 58 undergoes significantly less rotation. The cup 52 follows the in-line path 90, and the second planetary shaft 28 remains more closely aligned with the in-line path 90.

Figure 7:
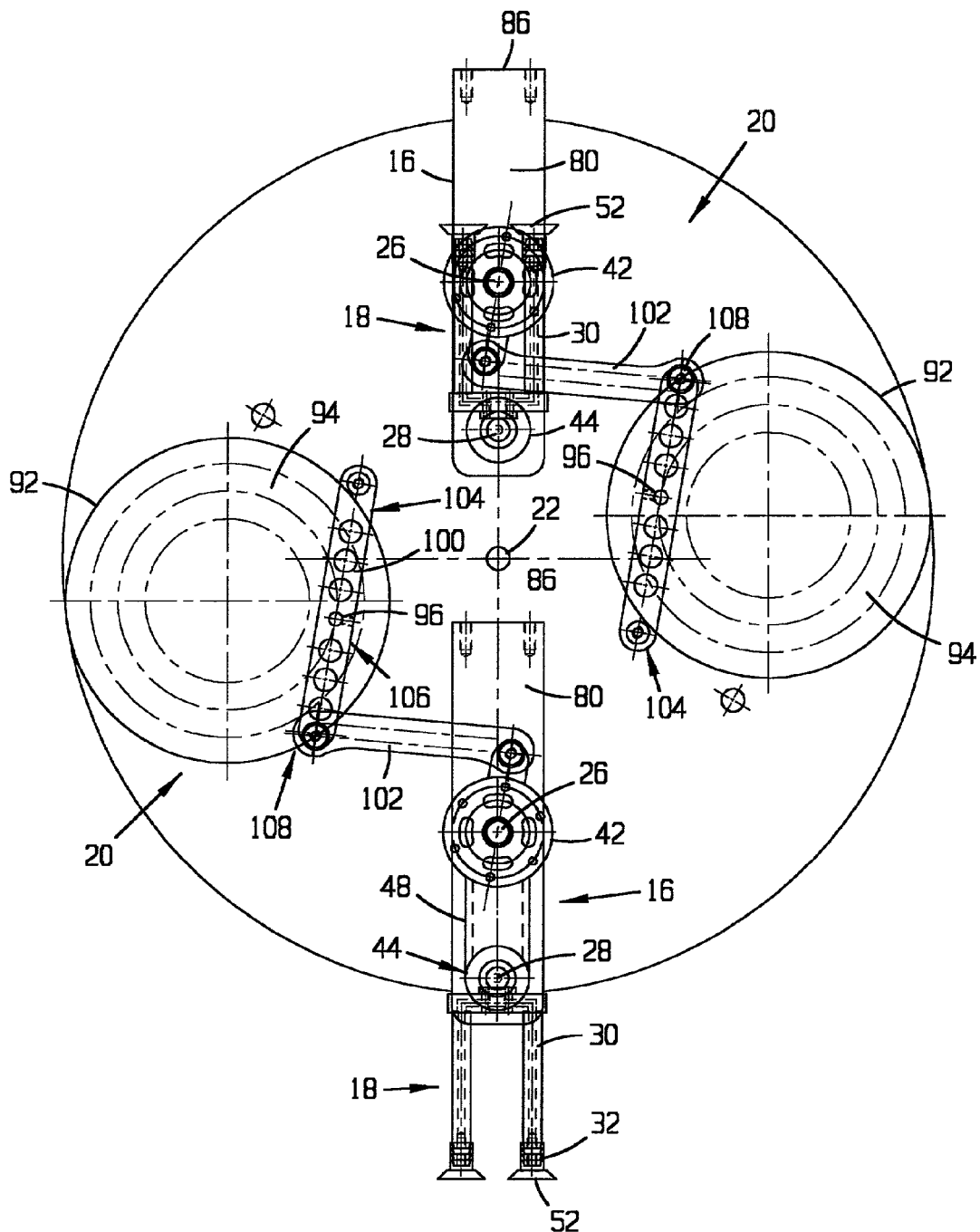
FIG. 7 is a side plan view of a two head, three stop, secondary motion, rotary transfer apparatus.
Figure 8:
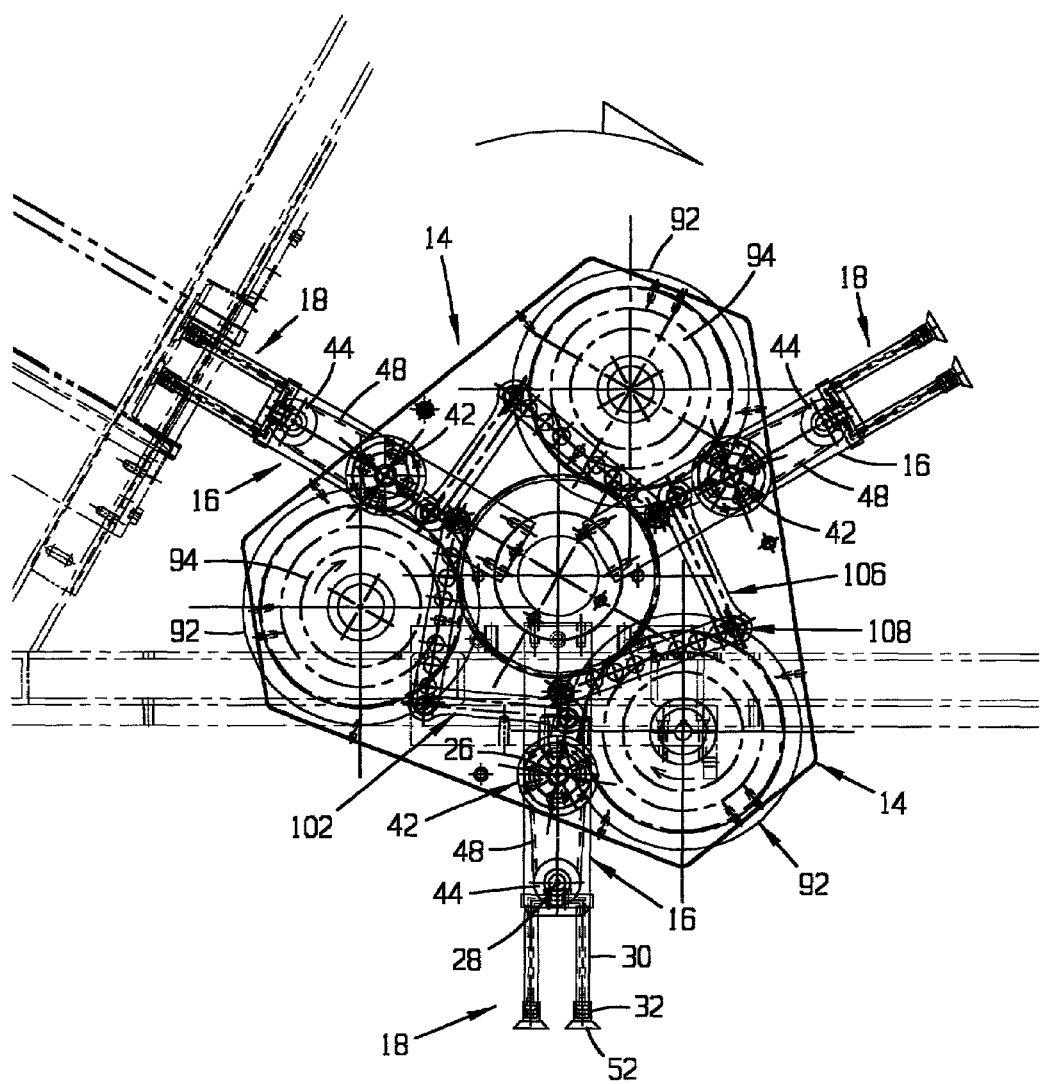
FIG. 8 is side plan view of a three head, three stop, secondary motion, rotary transfer apparatus.

Referring now to FIG. 7, a side view of the cam mechanism 20, secondary planetary member 16 and article transfer mechanism 18 is shown for a two head, three stop, secondary motion apparatus 10. FIG. 7 shows two second planetary members 16 and the associated article transfer mechanism 18 for each, as well as an associated offset cam mechanism 20 connected to each second planetary member 16. The second planetary shaft 28 is attached to the secondary planetary gear 44, which is in rotational communication with the secondary stationary gear 42 by way of the continuous chain 48. The offset cam mechanism 20 oscillates the secondary stationary gear 42 to provide the desired oscillating rotational offset motion to the second planetary shaft 28. The offset cam mechanism 20 includes a cam structure 92 connected, or otherwise adapted, to rotate with the first idler gear 46. The illustrated cam structure 92 has a predetermined cam contour 94, a cam follower 96 adapted to cooperate with the cam contour 94 of the cam structure 92, and a cam linkage 98 adapted for linking the cam follower 96 to the secondary stationary gear 42. A rise and fall motion of the cam follower 96, in the direction of the arrows, oscillates the secondary stationary gear 42. For example, each cam linkage 98 may include a lever arm 100 and a linkage arm 102. The lever arm 100 has a first portion 104 pivotally attached to the first planetary member 14, a second portion 106 connected to the cam follower 96, and a third portion 108 hinged to the linkage arm 102. The linkage arm 102 is operatively linked to the secondary stationary gear 42. The predetermined rise and fall movement of the cam follower 96 causes the lever arm 100 to pivot, which causes the linkage arm 102 to provide the desired oscillating rotational offset to the secondary stationary gear 42. The gear-encircling continuous chain 48 transfers the oscillating rotation offset motion to the second planetary shaft 28. A similar view of a three head, three stop, secondary motion apparatus 10 is shown in FIG. 8.

Figure 9:
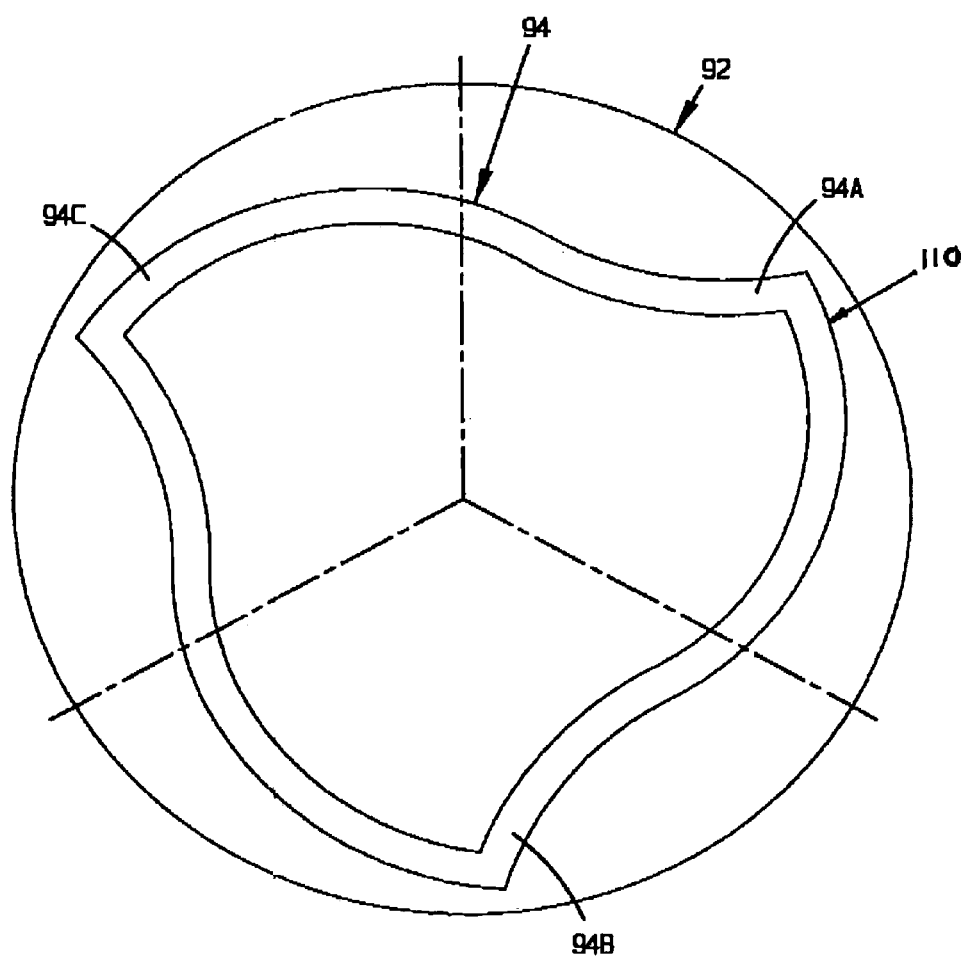
FIG. 9 is as plan view of one embodiment of the cam structure of the present invention, with identical cam sectors for a three stop, secondary motion, rotary transfer apparatus.
Figure 10:
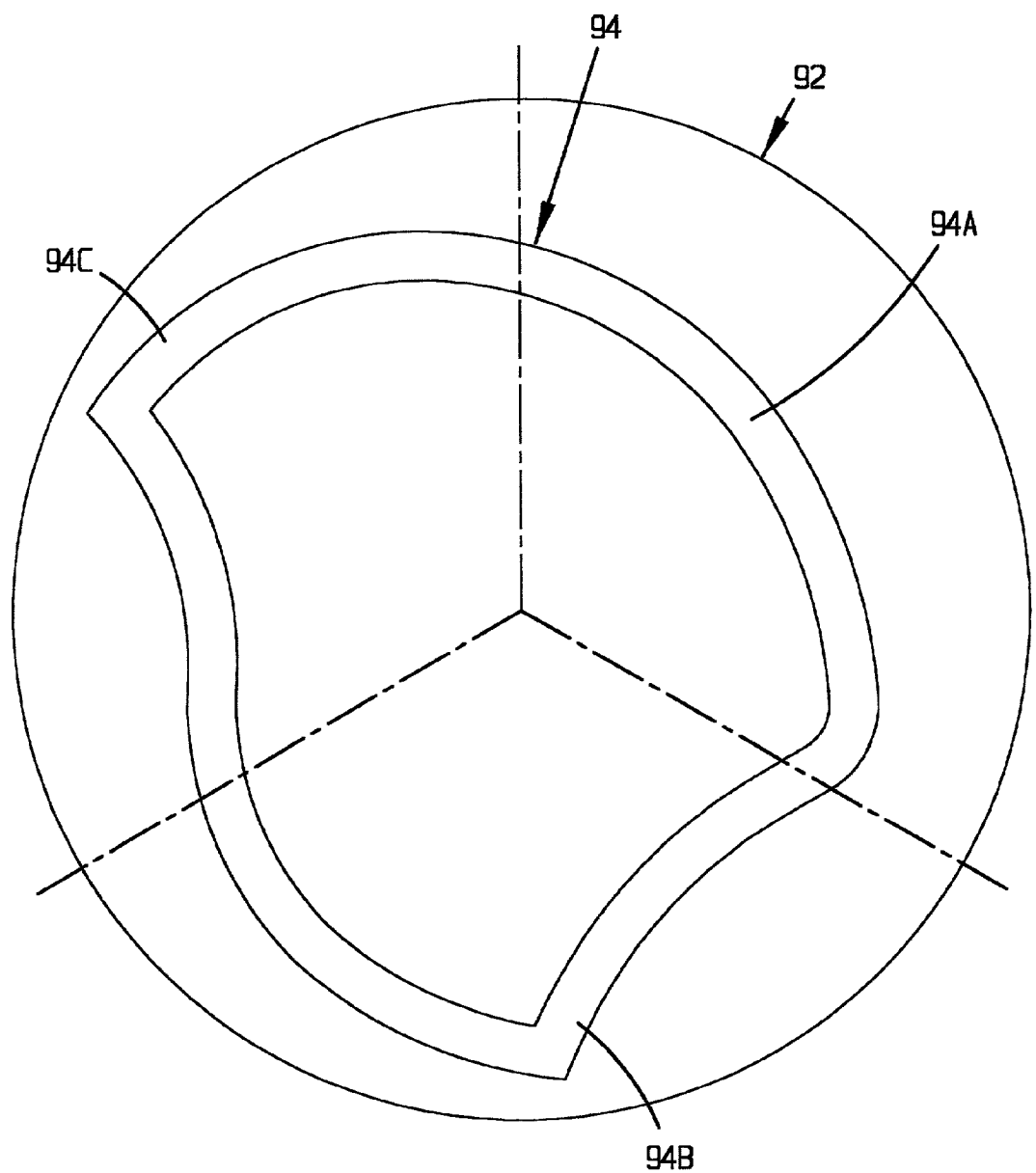
FIG. 10 is a perspective view of an alternative embodiment of a cam structure, with non-identical cam contour sectors, of the present invention.

In either of these secondary motion apparatus 10, the cam mechanism 20 is designed so that the cam structure 92 makes one revolution relative to the cam follower 96 for each revolution of the first planetary member 14. This is achieved by providing a first idler gear 46 that, likewise, makes one revolution for each revolution of the first planetary member 14 and rigidly attaching the cam structure 92 thereto. One revolution of the first planetary member 14 moves the article transfer mechanism 18 from a selected apex 36, through one complete article transfer path 34, and back to the selected apex 36. The cam contour 94 is divided into contour sectors with each sector providing the desired oscillating rotational offset to the second planetary shaft 28 and attached article transfer mechanism 18 between each article path apex 36. Thus, for a three apex (stop) path, each contour sector 94a, 94b, 94c occupies 120 degrees of the total circular cam contour 94, as illustrated in FIG. 9. For a four apex (stop) path, each contour sector occupies 90 degrees of the total circular cam contour 94. Each contour sector 94a, 94b, 94c of FIG. 9 is identical and, therefore, provides identical oscillating rotational offset to the second planetary shaft 28 and attached article transfer mechanism 18 between each article path apex 36. In order to provide non-identical motion or function of the article transfer mechanism 18 at two article path apexes 36, the contour sector for the two apexes 36 must be different. For example, a three apex (stop) path with a pick apex, a sweep apex and a place apex, requires three contour sectors of 120 degrees each, with the pick and place contour sectors identical and the sweep contour sector non-identical. An example of a cam structure 92 containing a cam contour 94, having non-identical contour sectors, is shown in FIG. 10.

Referring now to FIG. 6, to obtain extended in-line motion at a selected path apex 36, the secondary stationary gear 42, and ultimately the second planetary shaft 28, is oscillated through a controlled motion as the distal end of the stem 30 recedes from the apex 36 and through a harmonic motion and a controlled motion as the stem 30 advances toward the apex 36. The controlled motion is the predetermined offset for the second planetary shaft 28 that provides the desired extended in-line motion in the in-line path 90 rather than the tapered path 88 that results for a secondary motion apparatus without an offset cam mechanism 20. The cam structure 92, and in particular the profile 110 of a sector 94a of the cam contour 94, is designed to create the desired controlled motion toward and away from the apex 36. For example, in a four-stop, secondary motion rotary transfer apparatus, the path has four apexes. Each second planetary shaft 28 undergoes one full 360° rotation as it travels 90° about the primary stationary gear 38 between successive apexes 36. Therefore, a sector 94a of cam contour 94 includes portions for controlling the motion receding away from the apex and advancing toward the apex.

The desired cam profile 110 for a sector 94a of the cam contour 94 tat provides the controlled portions is determined by working backwards from the desired in-line motion, i.e. determining the required offset from stein line segments 58 that produce the tapered path 88 to stem line segments 58 that produce the in-line path 90. A required offset angle for the second planetary shaft 28 may be determined for every degree of rotation near the apex, for example 30° about the primary stationary gear 38 or 33% of the sector 94a of the cam contour 94 in the four-stop apparatus. Either no or a minimal amount of offset is required during the first 10° or 11° of rotation about the primary stationary gear 38. Thus, the first 12% of the cam profile may be a dwell portion in which there is no rise or fall in the cam follower 96. Thereafter, however; a more substantial offset of the second planetary shaft 28 is required to prevent the stem 30 from rotating and to maintain the cup in the in-line path 90, thus requiring a predetermined control portion. The desired offset of the second planetary shaft 28 is converted into a desired rise of the cam follower for the cam profile. This relationship depends on the geometry of the cam linkage 98 and the mechanical advantage of any levers contained therein. A mirror image of the cam profile designed to recede the stem 30 from an apex 36 in an in-line or near in-line motion may be used to advance the stem 30 toward an apex 36 in a similar in-line or hear in-line motion.

Thus, the secondary motion, rotary transfer apparatus 10 of the present invention provides improved flexibility in that the particular motion at each path apex 36 is determined by the particular cam contour 94 of the cam structure 92. To vary the apex motions, a cam structure 92 with a different cam contour 94 simply needs to be substituted for a presently used cam structure/contour.

The descriptions above and the accompanying materials should be interpreted in the illustrative and not the limited sense. While the invention has been disclosed in connection with the preferred embodiment or embodiments thereof, it should be understood that there may be other embodiments which fall within the scope of the invention.

The invention claimed is:

1. A rotary transfer apparatus, comprising:
    (a) a frame structure;
    (b) a rotatable main shaft supported by the frame structure;
    (c) a first planetary member coaxially rotatably connected to the main shaft;
    (d) a plurality of first planetary shafts rotatably connected to the first planetary member and rotating in relation to the main shaft:
    (e) a plurality of second planetary members, at least one second planetary member being connected to each first planetary shaft and rotating in relation to the main shaft, each second planetary member including a second planetary shaft rotating in relation to a corresponding first planetary shaft;
    (f) a plurality of article transfer mechanisms, at least one article transfer mechanism being connected to each second planetary member second planetary shaft, each transfer mechanism moving in a non-identical path at two path apexes; and
    (g) a plurality of rotary offset cam mechanisms rotatably secured to the first planetary member, at least one offset cam mechanism being operatively connected to each second planetary member and providing, by its rotary movement, movement of a corresponding article transfer mechanism in non-identical functionality at two path apexes, wherein
    each cam mechanism includes a cam structure adapted to rotate with a corresponding primary gear, wherein each cam structure has a cam contour and a cam follower adapted to cooperate with the cam contour of the cam structure,
    the cam structures are radially offset from the first and second planetary shafts with respect to the main shaft,
    each primary gear makes one revolution for each revolution of the first planetary member, and
    each article transfer mechanism path has at least three apexes and each second planetary shaft undergoes one full 360° rotation traveling between successive apexes.

2. The rotary transfer apparatus of claim 1, wherein each second planetary shaft is attached to a secondary planetary gear, the secondary planetary gear being in rotational communication with a secondary stationary gear, each cam mechanism being adapted for oscillating a corresponding secondary stationary gear to provide the oscillating rotational offset motion to a corresponding second planetary shaft.

3. The rotary transfer apparatus of claim 2, wherein each cam mechanism includes a cam follower adapted to cooperate with the cam contour of the cam structure, and a cam linkage adapted for linking the cam follower to a corresponding secondary stationary gear, whereby a rise and fall motion of the cam follower oscillates the secondary stationary gear.

4. The rotary transfer apparatus of claim 3, wherein each cam linkage includes a lever arm and a linkage arm, each lever arm having a first portion pivotally attached to the first planetary member, a second portion connected to the cam follower, and a third portion hinged to the linkage arm.

5. The rotary transfer apparatus of claim 1, wherein each cam contour has a cam contour sector associated with each apex of the transfer mechanism path, at least two contour sectors being non-identical.

6. The rotary transfer apparatus of claim 5, wherein each cam contour sector occupies 360°/n of the cam contour where n equals the number of apexes in the transfer mechanism path.

7. The rotary transfer apparatus of claim 5, further comprising:
    (a) a primary stationary gear connected to the frame structure, the main shaft extending through and rotating in relation to the primary stationary gear;
    (b) at least one primary planetary gear in rotational communication with the primary stationary gear and connected to each first planetary shaft;
    (c) a secondary stationary gear corresponding to each primary planetary gear, each secondary stationary gear being connected to the first planetary member, each first planetary shaft extending through and rotating in relation to each secondary stationary gear; and (d) at least one secondary planetary gear in rotational communication with each secondary stationary gear and connected to each second planetary shaft.

8. The rotary transfer apparatus of claim 7, further comprising a secondary continuous chain member which is in rotational communication between each secondary stationary gear and each secondary planetary gear.

9. The rotary transfer apparatus of claim 8, wherein each primary gear is a primary idler gear disposed in rotational communication between the primary stationary gear and each primary planetary gear, and wherein the rotating cam structure of each offset cam mechanism is secured to the primary idler gear.

10. The rotary transfer apparatus of claim 7, wherein a primary gear ratio between each primary planetary gear and the primary stationary gear is three-to-one and a secondary gear ratio between each secondary planetary gear and each secondary stationary gear is one-to-one, whereby the rotary transfer apparatus is a three-stop, secondary motion, rotary transfer apparatus.

11. The rotary transfer apparatus of claim 7, wherein a primary gear ratio between each primary planetary gear and the primary stationary gear is four-to-one and a secondary gear ratio between each secondary planetary gear and each secondary stationary gear is one-to-one, whereby the rotary transfer apparatus is a four-stop, secondary motion, rotary transfer apparatus.

12. The rotary transfer apparatus of claim 1, wherein a linkage arm of each offset cam mechanism is pivotally secured to the first planetary member.

13. The rotary transfer apparatus of claim 1, wherein the plurality of first planetary shafts comprises three first planetary shafts, the plurality of second planetary members comprises three second planetary members, the second planetary shafts comprise three second planetary shafts, and the plurality of article transfer mechanisms comprise three article transfer mechanisms, each of the three first planetary shafts relating to one of the three second planetary members, which relates to one of the three second planetary shafts, which relates to one of the three article transfer mechanisms.

14. The rotary transfer apparatus of claim 1, wherein each second planetary shaft is attached to a secondary planetary gear, the secondary planetary gear being in rotational communication with a secondary stationary gear, each cam mechanism being adapted for oscillating a corresponding secondary stationary gear to provide the oscillating rotational offset motion to a corresponding second planetary shaft.

15. The rotary transfer apparatus of claim 14, wherein each cam mechanism includes a cam structure adapted to rotate with a corresponding primary idler gear wherein each cam structure has a predetermined cam contour, a cam follower adapted to cooperate with the cam contour of the cam structure, and a cam linkage adapted for linking the cam follower to a corresponding secondary stationary gear, whereby a rise and fall motion of the cam follower oscillates the secondary stationary gear.

16. The rotary transfer apparatus of claim 15, wherein each cam linkage includes a lever arm and a linkage arm, each lever arm having a first portion pivotally attached to the first planetary member, a second portion connected to the cam follower, and a third portion hinged to the linkage arm.

17. A rotary transfer apparatus, comprising:
(a) a frame structure;
(b) a rotatable main shaft supported by the frame structure;
(c) a first planetary member coaxially rotatably connected to the main shaft;
(d) a plurality of first planetary shafts rotatably connected to the first planetary member and rotating in relation to the main shaft;
(e) a plurality of second planetary members, at least one second planetary member being connected to each first planetary shaft and rotating in relation to the main shaft, each second planetary member including a second planetary shaft rotating in relation to a corresponding first planetary shaft;
(f) a plurality of article transfer mechanisms, at least one article transfer mechanism being connected to each second planetary member second planetary shaft, each transfer mechanism moving in a non-identical path at two path apexes; and
(g) a plurality of rotary offset cam mechanisms rotatably secured to the first planetary member, at least one offset cam mechanism being operatively connected to each second planetary member and providing, by its rotary movement, movement of a corresponding article transfer mechanism in non-identical functionality at two path apexes, wherein each cam mechanism is adapted for providing at least two separate and distinct oscillating rotational offset motions to a corresponding second planetary shaft, wherein each cam mechanism includes a rotating cam structure adapted to rotate with a corresponding primary gear, wherein each cam structure has a cam contour and a cam follower adapted to cooperate with the cam contour of the cam structure, the cam structures are radially offset from the first and second planetary shafts with respect to the main shaft, and each primary gear makes one revolution for each revolution of the first planetary member.

18. The rotary transfer apparatus of claim 17, wherein each cam mechanism includes a rotating cam structure and a cooperating cam follower adapted for oscillating a corresponding second planetary shaft to provide a sweeping motion at a first selected path apex, and a picking or placing motion at a second selected path apex.

19. The rotary transfer apparatus of claim 18, wherein each article transfer mechanism path has at least three apexes and each second planetary shaft undergoes one full 360° rotation traveling between successive apexes.

20. A secondary motion, rotary transfer apparatus, comprising:
(a) a frame structure;
(b) a rotatable main shaft supported by the frame structure;
(c) a primary stationary gear connected to the frame structure, the main shaft extending through and rotating in relation to the primary stationary gear;
(d) a first planetary member coaxially connected to the main shaft;
(e) a plurality of primary idler gears disposed in rotational communication with the primary stationary gear;
(f) a plurality of first planetary shafts rotatably connected to the first planetary member and rotating in relation to the main shaft;
(g) a plurality of primary planetary gears in rotational communication with a corresponding primary idler gear, at least one primary planetary gear being connected to each first planetary shaft;

(h) a plurality of second planetary members, at least one second planetary member being connected to each first planetary shaft;

(i) a plurality of secondary stationary gears, at least one secondary stationary gear corresponding to each primary planetary gear, each secondary stationary gear being connected to the first planetary member, each first planetary shaft extending through and rotating in relation to each secondary stationary gear;

(j) a plurality of second planetary shafts, at least one second planetary shaft being rotatably connected to each second planetary member;

(k) a plurality of secondary planetary gears, at least one secondary planetary gear being in rotational communication with each secondary stationary gear and connected to each second planetary shaft;

(l) a plurality of article transfer mechanisms, at least one article transfer mechanism being connected to each second planetary shaft, each article transfer mechanism being adapted for transferring articles, each article transfer mechanism having at least one stem connected to a corresponding second planetary shaft, each stem having a distal end whose motion defines a path about the main shaft, each path having at least two apexes, the distal end of each stem moving in a non-identical structure or functionality at two apexes; and (m) a plurality of rotary offset cam mechanisms rotatably secured to the first planetary member, each cam mechanism being operatively connected to a corresponding second planetary member to impart by its rotary movement at least two separate and distinct oscillating rotational offset motions to each second planetary shaft to produce movement of each distal end of each stem in non-identical paths at two path apexes, each offset cam mechanism including a cam structure rotatably connected to a corresponding primary idler gear, wherein each cam mechanism includes a cam structure adapted to rotate with a corresponding primary gear, wherein each cam structure has a cam contour and a cam follower adapted to cooperate with the cam contour of the cam structure, the cam structures are radially offset from the first and second planetary shafts with respect to the main shaft, and each primary gear makes one revolution for each revolution of the first planetary member.

21. The rotary transfer apparatus of claim 20, wherein each article transfer mechanism path has at least three apexes and each second planetary shaft undergoes one full 360° rotation traveling between successive apexes.

22. A rotary transfer apparatus, comprising:
(a) a frame structure;
(b) a rotatable main shaft supported by the frame structure;
(c) a first planetary member coaxially rotatably connected to the main shaft;
(d) a plurality of first planetary shafts rotatable connected to the first planetary member and rotating in relation to the main shaft:
(e) a plurality of second planetary members, at least one second planetary member being connected to each first planetary shaft and rotating in relation to the main shaft, each second planetary member including a second planetary shaft rotating in relation to a corresponding first planetary shaft;
(f) a plurality of article transfer mechanisms, at least one article transfer mechanism being connected to each second planetary member second planetary shaft, each transfer mechanism moving in a non-identical path at two path apexes;
(g) a plurality of rotary offset cam mechanisms rotatably secured to the first planetary member, at least one offset cam mechanism being operatively connected to each second planetary member and providing, by its rotary movement, movement of a corresponding article transfer mechanism in non-identical functionality at two path apexes;
(h) a primary stationary gear connected to the frame structure, the main shaft extending through and rotating in relation to the primary stationary gear;
(i) at least one primary planetary gear in rotational communication with the primary stationary gear and connected to each first planetary shaft;
(j) a secondary stationary gear corresponding to each primary planetary gear, each secondary stationary gear being connected to the first planetary member, each first planetary shaft extending through and rotating in relation to each secondary stationary gear; and
(k) at least one secondary planetary gear in rotational communication with each secondary stationary gear and connected to each second planetary shaft, wherein each article transfer mechanism path has at least three apexes and each second planetary shaft undergoes one full 360° rotation traveling between successive apexes, each offset cam mechanism includes a cam structure with a cam contour sector associated with each apex of the transfer mechanism path, at least two contour sectors being non-identical, and both the first planetary member and the second planetary member include a pair of parallel plates, the primary stationary gear and each primary planetary gear being positioned between the plates of the first planetary member, each secondary stationary gear and each secondary planetary gear being positioned exterior the plates of the second planetary member.

* * * * *